Figure 1:
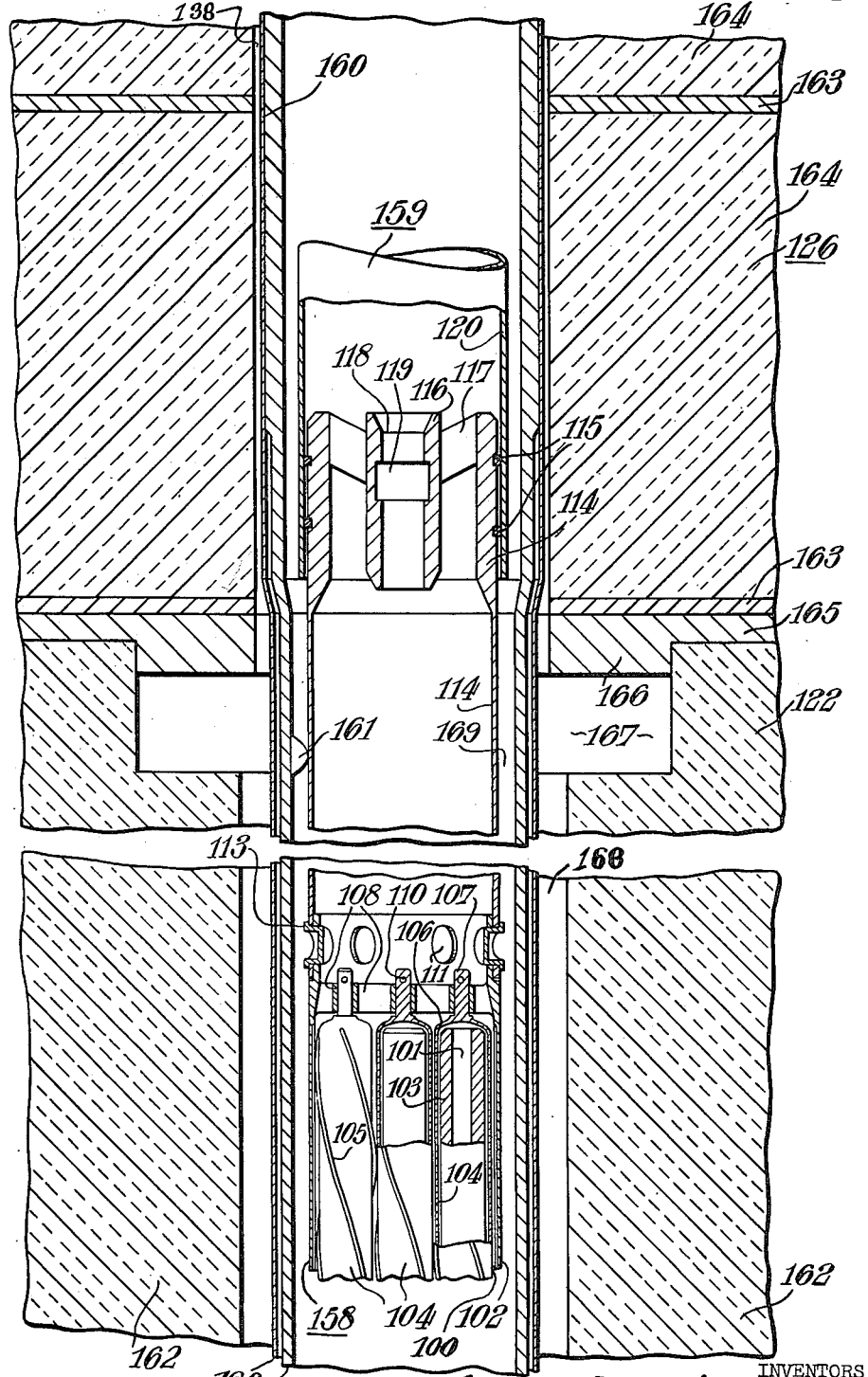

May 7, 1963     S. FAWCETT ETAL     3,088,897

FUEL ELEMENTS FOR NUCLEAR REACTORS

Filed June 24, 1958     2 Sheets-Sheet 1

INVENTORS
SYDNEY FAWCETT
FRANK GEOFFREY GREENHALGH
BY   Larson and Taylor
ATTORNEYS

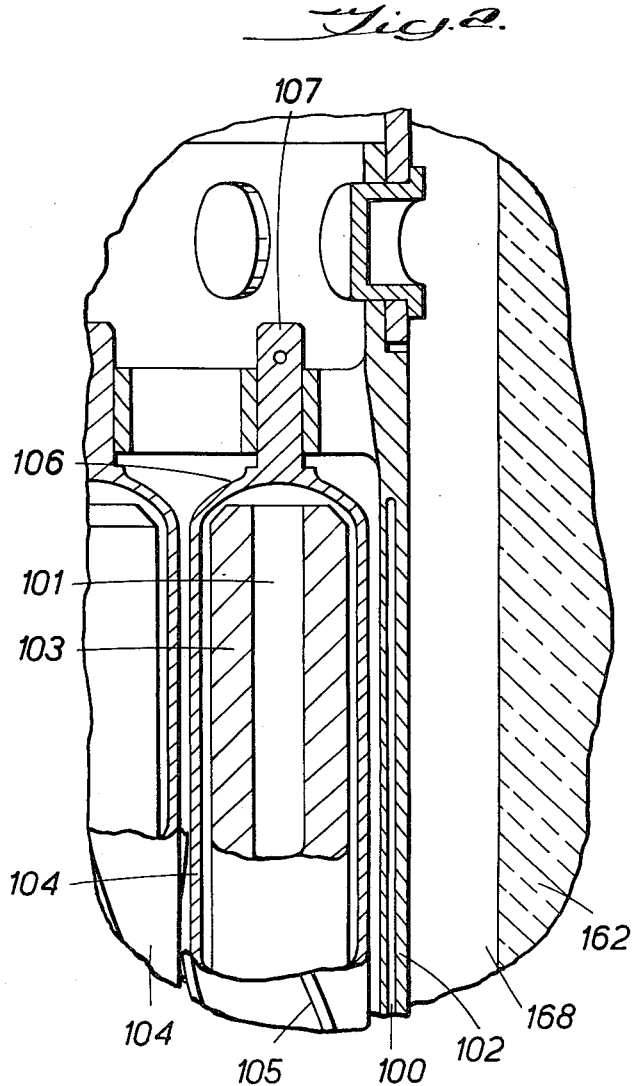

3,088,897
FUEL ELEMENTS FOR NUCLEAR REACTORS

Sydney Fawcett, Hale Barnes, and Frank Geoffrey Greenhalgh, Wigan, England, assignors to United Kingdom Atomic Energy Authority, London, England
Filed June 24, 1958, Ser. No. 744,208
Claims priority, application Great Britain June 24, 1957
3 Claims. (Cl. 204—193.2)

This invention relates to nuclear reactors and it has an application in the sodium graphite reactor disclosed in detail in copending application Serial No. 744,185, now U.S. Patent No. 3,000,728, of even date filed in the names of Long and Challender. It is concerned with re-entrant cooling systems for nuclear reactors: that is, cooling systems wherein coolant flows first along an outer annulus of an extended fuel element channel and then reverses its flow along an extended fuel-containing tube inside the annulus. The fuel-containing tube serves primarily to divide the annulus flow of coolant from the flow in the tube, which first passes over the fuel and then along the extended part. The tube is preferably made as a double-wall tube with a gas insulating space to reduce heat transfer between the cool annulus flow and the heated fuel tube flow.

According to the present invention in a re-entrant cooling system for a nuclear reactor that part of the fuel-containing tube which is normally occupied by the fuel is adapted to be removable from its extended part together with the fuel.

The arrangement according to the invention allows the fuel-containing tube to be operated at highly rated conditions in that its corrosion and wear will not have to be sustained for a longer time than the life of the fuel. This quality becomes important where zirconium is selected as the material for that part of the cooling system in the reactor core and sodium is used in the coolant as the reaction between sodium and zirconium is thought to become significant near the temperature of 450° C. To keep the temperature to a figure well below 450° C. would be likely to seriously affect the economics of a sodium-cooled graphite moderated reactor for example, even to the extent of rendering the design non-competitive. The extended part of the fuel-containing tube, in which neutron absorption is not critical, may be made of other materials, such as mild steel.

The invention will now be described with reference to FIG. 1 which is a sectional view.

FIG. 2 is an enlarged view of a portion of FIG. 1.

In the drawing nuclear fuel in the form of clusters of seven fuel rods 101 is housed in the lower zirconium part 158 of a fuel containing tube 159 having an upper, mild steel extended part 120. The lower part 158 is made up of a set of double-walled sleeves 102 stacked one upon another. The heat insulation gap between the walls is indicated by the reference numeral 100. The fuel rods 101 comprise uranium tubes 103 in protective stainless steel sheaths 104 with helical fins 105 and welded end caps 106. The end caps 106 carry plugs 107 which serve to support the fuel rods 101 in spiders 108 attached to the sleeves 102. Split pins 110 fix the fuel rods 101 in the spiders 108.

The sleeves 102 have perforations 111 and are joined together by tubular connecting pins (i.e. pins such as pins 113 referred to below but without blanked-off ends) passing through and expanded into perforations 111 in adjacent sleeves 102. The top perforations 111 are blocked off by connecting pins 113 which connect the top sleeve 102 with a tube 114 having piston rings 115 to seal with the upper part 120. The tube 114 carries a boss 116 on webs 117. The boss 116 has a central bore 118 with a recessed part 119 which can accommodate an expandible tool for lifting the assembly of fuel and zirconium tube 158.

The fuel containing tube 159 is located by dimples 161 in an outer double-walled zirconium tube 160 which rests in a fuel element channel 138. The tube 160 is thimble-shaped and with the tube 159 forms an outer annulus 169 for fuel element coolant. The fuel element channel 138 extends through the graphite moderator structure 162, graphite reflector structure 122 and neutron shield 126 comprising boron steel plates 163 inserted between layers of graphite 164. Moderator coolant gas flows through the moderator and reflector structures 162, 122 into the gas space 167, a passage way 168 being left between the tube 160 and the channel 138, but access to the neutron shield 126 is prevented by a mild steel sheath 165 which carries spigots 166 to locate the neutron shield on the reflector structure 122.

In operation the fuel rods 101 are assembled in the sleeves 102 and loaded into fuel element channels 138 in a nuclear reactor so as to leave the annulus 169 between tube 160 and the sleeves 102 (which together with tube 120 forms the tube 159). Coolant sodium is fed into the annulus 169 and flows down through the reactor and, as the double-walled tube 160 is thimble-shaped, returning up the inside of the sleeves 102 between the fuel rods 101.

The assembly of fuel and tube 158 may at any time be removed from the reactor by means of an expandible tool fitted into the recessed part 119. The mild steel tube 120 remains in the reactor together with the outer double-walled zirconium tube 160 which is exposed to sodium at comparatively low temperatures only. The mild steel tube 120 is not attacked by the sodium at operating temperatures acceptable to zirconium.

We claim:

1. In a nuclear reactor having a tubular member disposed upright in a vertical channel in the moderator, means for retractably locating fuel elements in the channel and with the tubular member defining a re-entrant flowpath for the passage of fluid coolant in and out of the channel, said means comprising a second tubular member extending co-axially within the first-named tubular member and defining an annular space therewith, a third tubular member extending within the lower terminal portion of the second tubular member and depending below said lower terminal portion so as to form a telescopic extension of the second tubular member within the first-named tubular member, and means mounted in the third tubular member for supporting fuel elements therewithin.

2. A nuclear reactor according to claim 1 wherein a sodium fluid coolant is passed in and out of the channel, said second tubular member is of steel and said third tubular member is of zirconium.

3. A nuclear reactor according to claim 1 further comprising means on the third tubular member for engagement with means for withdrawing it through the second tubular member.

References Cited in the file of this patent
UNITED STATES PATENTS
2,848,404     Treshow _____ Aug. 19, 1958

OTHER REFERENCES

International Conference on Peaceful Uses of Atomic Energy, 1955, vol. 2, pages 337–350, 444.